April 23, 1940.  J. J. CHYLE  2,198,331
SEAM FOR ALLOY LINED VESSELS
Filed Jan. 12, 1939

John J. Chyle
INVENTOR.

BY
ATTORNEY.

Patented Apr. 23, 1940

2,198,331

UNITED STATES PATENT OFFICE 2,198,331

SEAM FOR ALLOY LINED VESSELS

John J. Chyle, Milwaukee, Wis., assignor to A. O. Smith Corporation, Milwaukee, Wis., a corporation of New York Application January 12, 1939, Serial No. 250,464

9 Claims. (Cl. 219—10)

This invention relates to seams for alloy lined vessels and has particular reference to the manufacture of welded vessels which are lined with thin sheets or layers of alloy material to protect the same from corrosion or other forms of attack encountered in oil cracking and refining and in many chemical and process industries.

The principal object of the invention is to provide a welded seam in the alloy liner of identically the same alloy composition as the liner material, and which is not in any way contaminated by fusion with the base plate or steel beneath the liner.

Another object is to provide an alloy lined vessel with welded liner seams which are smooth and leak proof, will not collect dirt in use and which have the same composition as the adjacent liner material.

Other objects will appear hereinafter in the description of the preferred embodiments of the invention as illustrated in the accompanying drawing.

The invention is applicable to the manufacture of vessels and other structures lined or coated with alloy material and to several types of lining material including what is known as alloy sheet liners and also the deposit or fused type of liner. For the purposes of simplicity, however, the description here will be directed to the application of the invention to vessels lined with alloy sheet material which is secured to the plates from which the vessel is fabricated.

Figure 1:
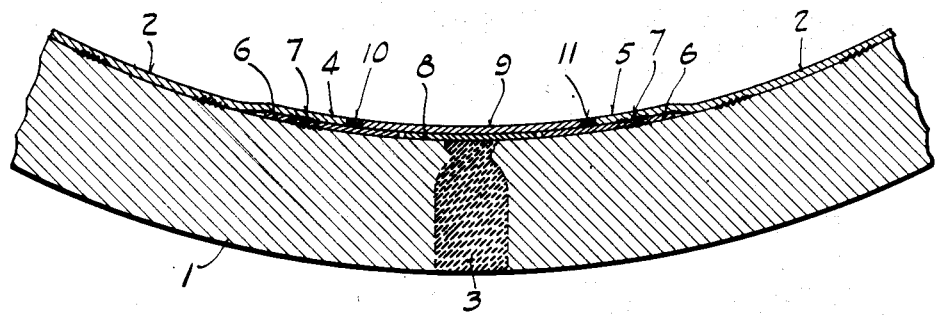
Figure 1 is a sectional view showing a longitudinal seam in a lined vessel.

In carrying out the present invention, and having specific reference to Fig. 1 of the drawing, the plate I which has been lined with one or more liner sheets 2 by electric resistance spot welding, has been rolled into a cylindrical ring and the longitudinal seam welded as at 3.

During the application of the liner sheet 2 its respective edges 4 and 5 have been raised and a thin alloy strip 6 inserted beneath each edge and secured in position by a final row of spot welds 7 welding the respective edges of the liner sheet to the strip and the latter to the plate beneath.

The strip 6 extends closer to the edge of the plate than does the respective liner sheet edges 4 and 5 thereby providing a ledge for receiving a cover plate. The strip 6 has the same alloy composition as the liner sheet or may be of higher alloy composition to provide the same desirable characteristics as the liner sheets.

After the seam 3 in the plate stock is welded there is a space between the respective strips 6 which is partially filled in by a third strip 8 covering the weld 3. This strip 8 is of the same thickness as strip 6 and may be either of alloy material or ordinary steel and need not be secured in place.

Then a final cover plate 9 of alloy material similar to that of the liner sheet is placed over the structure extending from the edge 4 of the liner sheet to the edge 5 of the liner sheet leaving a suitable space at the edges for welding. Seams 10 and 11 are then welded, preferably by electric arc welding, employing weld material of alloy composition similar to the lining sheets so as to join the edges 4 and 5 of liner sheet 2 to the cover plate 9, thereby making a final tight liner structure. By reason of the fact that the welded seams 10 and 11 are bound entirely on both sides and the bottom by alloy material of the same composition there is no opportunity for the weld to be contaminated by fusion with the base steel plate or other material.

Where the plate 9 is too wide it may be advisable to make strip 8 of similar alloy material and to bond the cover plate 9 to it at intervals as by arc welding. In this case the strip 8 should also be bonded at its edges to the base plate I beneath. In thus additionally bonding the cover plate 9 through strip 8 to the vessel wall better heat transfer may be obtained.

With the invention as illustrated in Fig. 1 it is possible to detect any leaks in seam 3 during what is known as the hydrostatic pressure test, by merely providing a few small openings in the cover plate 9 to admit the testing fluid beneath it. The openings can be filled later with alloy weld metal. The liner seams are also subject to possible test by the fluid pressure test method now employed in testing the spot welding of the liner sheets.

Circumferential seams in the vessel shell should be welded in the same manner as the longitudinal seam above described.

Figure 2:
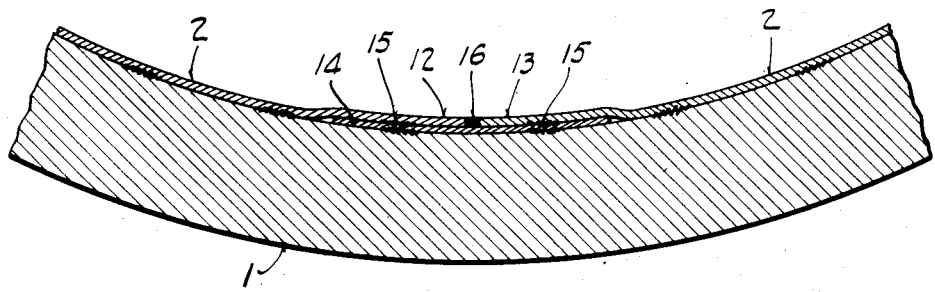
Fig. 2 is a similar view showing an intermediate longitudinal seam in the liner plate only.

In the lining of vessels the liner sheets are usually small in extent relative to the plates and therefore it is necessary to weld intermediate seams between liner sheets and over the plate itself. This can be done in accordance with the present invention as illustrated in Fig. 2. Here the adjacent edges 12 and 13 of the liner sheets 2 are raised and a strip 14 of similar alloy composition positioned beneath. Depending upon the width of strip 14, spot welds 15 may be employed to secure the liner edges 12 and 13 to it and to secure it to the plate 1 beneath. Then an arc weld 16 joins the edges 12 and 13 of sheets 2 over the center of strip 14.

It would be possible in some instances to place the strip 14 on the outside, over the top of the meeting edges of the liner sheets and to weld the strip at its edges to the liner sheet. However, this type of joint provides a more or less rough interior at the welded seam and grinding or polishing the weld may either leave rough areas or cut into the liner sheets making areas of less thickness than desired. By the use of the present invention the liner surface is not roughened and the weld may be polished off without danger of injuring the lining.

The inserted strips may be of the same thickness as the lining material, but preferably they are made of less thickness in order to avoid too great a raise in the lining.

Various embodiments of the invention may be employed within the scope of the accompanying claims.

The invention is claimed as follows:

1. An alloy lined vessel having a welded seam in the lining comprising liner edges raised above the plane of the liner sheets, a weld joining said edges and providing a continuous substantially smooth lining of a uniform alloy composition, and a strip of alloy beneath said weld to prevent contamination of the same from the base plate beneath during welding.

2. An alloy lined vessel having a welded seam in the lining disposed over a welded seam in the vessel comprising an alloy strip of the same composition as the lining partially inserted beneath each of the lining edges and extending part way to the weld in the vessel wall, a strip of metal of the same thickness as said alloy strips disposed over said weld in the vessel wall and between the edges of said strips, an alloy strip of the same thickness and composition as said lining extending over the outer edges of said first named alloy strips and over said intermediate strip, and welds uniting the edges of said last named alloy strip to the adjacent edges of the lining material.

3. An alloy lined vessel having a welded seam in the lining disposed over a welded seam in the vessel comprising an alloy strip of the same composition as the lining partially inserted beneath each of the lining edges and extending part way to the weld in the vessel wall, electric resistance welds uniting the lining material adjacent the liner edges through said alloy strips to the vessel wall, a strip of metal of the same thickness as said alloy strips disposed over said weld in the vessel wall and between the edges of said strips, an alloy strip of the same thickness and composition as said lining extending over the outer edges of said first named alloy strips and over said intermediate strip, and welds uniting the edges of said last named alloy strip to the adjacent edges of the lining material.

4. An alloy lined vessel having a welded seam in the lining disposed over a welded seam in the vessel comprising an alloy strip of the same composition as the lining partially inserted beneath each of the lining edges and extending part way to the weld in the vessel wall, electric resistance welds uniting the lining material adjacent the liner edges through said alloy strips to the vessel wall, a strip of metal of the same thickness and composition as said alloy strips disposed over said weld in the vessel wall and secured thereto between the edges of said strips, an alloy strip of the same thickness and composition as said lining extending over the outer edges of said first named alloy strips and over said intermediate strip, and secured to the latter, and welds uniting the edges of said last named alloy strip to the adjacent edges of the lining material.

5. An alloy lined vessel having a welded seam in the lining comprising liner edges raised above the plane of the liner sheets, a weld joining said edges and providing a continuous substantially smooth lining of a uniform alloy composition, and a strip of alloy beneath said weld to prevent contamination of the same from the base plate beneath during welding, and welds joining at least one of the liner edges through said strip to the wall of the vessel.

6. An alloy lined vessel having a welded seam in the lining comprising an alloy strip of the same composition as the lining inserted beneath the lining edges and extending across beneath said edges, and a weld joining the edges of lining material over said strip and providing a continuous substantially smooth lining of a uniform alloy composition, and welds joining the lining material adjacent the welded seam to said alloy strip and to the vessel wall beneath.

7. The method of welding a seam in an alloy lining in a lined vessel, comprising disposing beneath the liner edges to be welded together an alloy strip of the same composition as the liner material, and electric arc welding the liner edges together over said strip with added weld metal of the same composition as said liner material to provide a continuous substantially smooth liner of uniform alloy composition and free from contamination at the weld from the base plate beneath.

8. The method of welding a seam in an alloy lining in a lined vessel, comprising inserting beneath the lining edges to be welded a strip of alloy of the same composition as that of the lining material and extending across beneath said edges, electric resistance welding the lining material adjacent the edges thereof to said strip and the vessel wall, and welding the edges of said liner material together over said alloy strip to provide a continuous substantially smooth lining of a uniform alloy composition.

9. The method of welding a seam in an alloy lined vessel comprising inserting an alloy strip of the same composition as the lining part way beneath each of the lining edges, electric resistance welding the liner material adjacent the lining edges to the respective strips, welding the seam in the vessel wall, placing a strip of metal of the same thickness as said alloy strips over said weld in the vessel wall and between the edges of said strips, disposing an alloy strip of the same thickness and composition as said lining over the outer edges of said first named alloy strips and over said intermediate strip, and welding the edges of said last named alloy strip to the adjacent edges of the lining material.

JOHN J. CHYLE.